United States Patent
Ali et al.

(10) Patent No.: US 7,139,017 B2
(45) Date of Patent: Nov. 21, 2006

(54) METHOD AND SYSTEM FOR OBTAINING THE BEST PICTURE QUALITY IN A SCARCE-POWER DEVICE

(75) Inventors: Walid Ali, Montrose, NY (US); Yasser alSafadi, Yorktown Heights, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 423 days.

(21) Appl. No.: 10/059,441

(22) Filed: Jan. 29, 2002

(65) Prior Publication Data
US 2003/0142213 A1    Jul. 31, 2003

(51) Int. Cl.
G09G 5/00        (2006.01)
(52) U.S. Cl. .............................. 348/192; 345/211
(58) Field of Classification Search .............. 348/730, 348/180–194; 713/300–340; 702/60–62, 702/69
See application file for complete search history.

(56) References Cited

U.S. PATENT DOCUMENTS

| | | | | |
|---|---|---|---|---|
| 5,614,948 A * | 3/1997 | Hannah | ...................... | 348/255 |
| 5,870,613 A * | 2/1999 | White et al. | ................ | 713/300 |
| 5,903,765 A * | 5/1999 | White et al. | ................ | 713/310 |
| 6,285,406 B1 * | 9/2001 | Brusky | ........................ | 348/552 |
| 6,301,671 B1 | 10/2001 | Boice et al. | ................ | 713/322 |
| 6,542,202 B1 * | 4/2003 | Takeda et al. | ............... | 348/678 |
| 6,552,752 B1 * | 4/2003 | Tsuji et al. | .................. | 348/730 |
| 6,593,785 B1 * | 7/2003 | Field et al. | ................. | 327/156 |
| 6,684,338 B1 * | 1/2004 | Koo | .......................... | 713/300 |
| 6,768,520 B1 * | 7/2004 | Rilly et al. | ................. | 348/730 |
| 6,798,919 B1 * | 9/2004 | Ali et al. | .................... | 382/272 |
| 6,813,390 B1 * | 11/2004 | Ali | ............................. | 382/278 |
| 2001/0026630 A1 * | 10/2001 | Honda | ........................ | 382/107 |
| 2003/0128198 A1 * | 7/2003 | Mizuyabu et al. | .......... | 345/204 |
| 2004/0061695 A1 * | 4/2004 | Correa et al. | ............... | 345/211 |

* cited by examiner

*Primary Examiner*—Paulos M. Natnael
(74) *Attorney, Agent, or Firm*—Edward W. Goodman

(57) ABSTRACT

An apparatus and method for scaling the power consumption of a video processor is provided. The apparatus includes a video processor having a plurality of video-processing modules for receiving a stream of image signals at an input and producing a processed image stream at an output, wherein the video processor is initially set to process each received pixel of the image stream according to a preset power-consumption level; an evaluator, coupled to the video processor, for determining an objective-quality metric of the pixel characteristics that are indicative of video quality in the image stream; and, a power-management module, coupled to the evaluator, for obtaining a new power-consumption level for the video processor from a predetermined table according to the objective-quality metric determined by the evaluator, wherein the predetermined table contains a number of different arrangements of the video-processing modules to generate a plurality of power-consumption level. Alternatively, the user may also set the new power-consumption level manually.

15 Claims, 3 Drawing Sheets

| VIDEO PROCESSING CLAIM | MODULES SETTING | FEATURES OF THE RESULTING IMAGES | OVERALL PICTURE QUALITY | LEVEL OF POWER CONSUMPTION |
|---|---|---|---|---|
| ABCD | MAX SHARPNESS<br>MAX DE-BLOCKER<br>MID DE-NOISER<br>MAX COLOR MODIFICATION | CRISP AND SHARP<br>NO BLOCKS<br>MID NOISE | EXCELLENT | HIGH |
| AB | MID SHARPNESS<br>MID DE-BLOCKER | MODERATE SHARP<br>MID NOISE<br>MID | VERY GOOD | MODERATE |
| AD | MID SHARPNESS | MODERATE SHARP<br>SOME BLOCKS<br>SOME NOISE | GOOD | |

FIG. 3

| SETTING | POWER LEVEL | PICTURE QUALITY | ACTIVE MODULES | MODULES SETTING |
|---|---|---|---|---|
| 1 | $P_1 = 25\%$ | $Q_1$ BAD | A, D | $A_1, D_1$ |
| 2 | $P_2 = 50\%$ | $Q_2$ FAIR | A, B | $A_2, B_2$ |
| 3 | $P_3 = 75\%$ | $Q_3$ GOOD | A, B, C | $A_3, B_3, C_3$ |
| 4 | $P_4 = 100\%$ | $Q_4$ EXCELLENT | A, B, C | $A_4, B_4, C_4, D_4$ |

FIG. 4

METHOD AND SYSTEM FOR OBTAINING THE BEST PICTURE QUALITY IN A SCARCE-POWER DEVICE

BACKGROUND OF THE INVENTION

1. Field of the Invention

The present invention relates to a method and system for scaling the video-processing task by regulating the power consumption of a video processor.

2. Description of the Related Art

The speed of microprocessors has increased dramatically over the past several years. As a result, microprocessors are capable of handling more complex applications in much shorter periods of time. However, a significant increase in the speed requires a substantial increase in the power consumed by the microprocessor, thus requiring more powerful power supplies. In portable computing devices, the available source of power is limited but the peak power and the average power that are consumed by the microprocessor have significantly increased. As a result, streaming a video source to limited power devices (i.e., hand-held devices, portable devices, and cellular phones) typically results in a poor image quality. Although the limited computation resources on these devices may cause poor image quality, the main cause is due to the limited power available in these devices.

Accordingly, there is a need to improve the usage of a battery power consumption in a portable device by regulating the power consumed by the video processor thereof.

SUMMARY OF THE INVENTION

The present invention relates to an apparatus and method for regulating the power consumption of a video processor in a portable unit.

According to one aspect of the invention, a method for scaling the power consumption of a video processor of the type having a plurality of video-processing modules is provided. The method includes the steps of: receiving a sequence of video signals for a video-quality evaluation; determining an objective-image-quality metric of the sequence of the video signals, the objective-image-quality metric indicative of video quality; obtaining a new power-consumption level of the video processor based on the determined objective-image-quality metric from a predetermined table; and, processing the sequence of the video signals according to the new power-consumption level, wherein the new power-consumption level is obtained by selectively activating at least one of the video-processing modules. The predetermined table includes a number of different combinations of the video-processing modules to generate a plurality of levels of image quality. The plurality of the video-processing modules comprises a color-enhancement module, a sharpness-improvement module, a de-blocker module, and a white-noise-removal module. The method also provides a mode to set the new power-consumption level manually by a user.

According to another aspect of the invention, a method for scaling the power consumption of a video processor of the type having a plurality of video-processing modules. The method includes the steps of: converting a stream of video signals to a plurality of pixels; processing each of the pixels of the video stream at a preset power-consumption level to produce a processed image stream; determining an objective-quality metric of the pixel characteristic indicative of video quality in the image stream; and, obtaining a new power-consumption level for processing each of the pixels of the video stream according to predetermined criteria, wherein the new power-consumption level is obtained by selectively activating at least one of the video-processing modules. The step of obtaining the new power-consumption level comprises the step of modifying a combination of the video-processing modules that is used to process each of the pixels of the video stream. The predetermined criteria comprise a number of different combinations of the video-processing modules to generate a plurality of power-consumption levels by the video processor.

According to a further aspect of the invention, an apparatus for scaling the power consumption of a video processor is provided. The apparatus includes: a video processor having a plurality of video-processing modules for receiving a stream of image signals at an input and producing a processed image stream at an output, the video processor processing each received pixel of the image stream according to a preset power-consumption level; an evaluator, coupled to the video processor, for determining an objective-quality metric of the pixel characteristics indicative of video quality in the image stream; and, a power-management module, coupled to the evaluator, for obtaining a new power-consumption level for the video processor from a predetermined table based on the determined objective-quality metric of the evaluator, wherein the plurality of the video-processing modules comprises a color-enhancement module, a sharpness-improvement module, a de-blocker module, and a white-noise-removal module. The apparatus further includes a converter for converting analog signals into corresponding digital signals, wherein the digital signals include a plurality of pixels, and a user control, coupled to the video processor, for setting the new power-consumption level manually by a user. The predetermined table includes a number of different combinations of the video-processing modules to generate a plurality of power-consumption levels.

BRIEF DESCRIPTION OF THE DRAWINGS

A more complete understanding of the method and apparatus of the present invention is available by reference to the following detailed description when taken in conjunction with the accompanying drawings wherein:

FIG. 3 shows a video-processing table according to the present invention; and FIG. 4 shows a power-management table according to the present invention.

DETAILED DESCRIPTION OF THE EMBODIMENTS

In the following description, for purposes of explanation rather than limitation, specific details are set forth such as the particular architecture, interfaces, techniques, etc., in order to provide a thorough understanding of the present invention. However, it will be apparent to those skilled in the art that the present invention may be practiced in other embodiments, which depart from these specific details. For purposes of simplicity and clarity, detailed descriptions of well-known devices, circuits, and methods are omitted so as not to obscure the description of the present invention with unnecessary detail.

Figure 1:
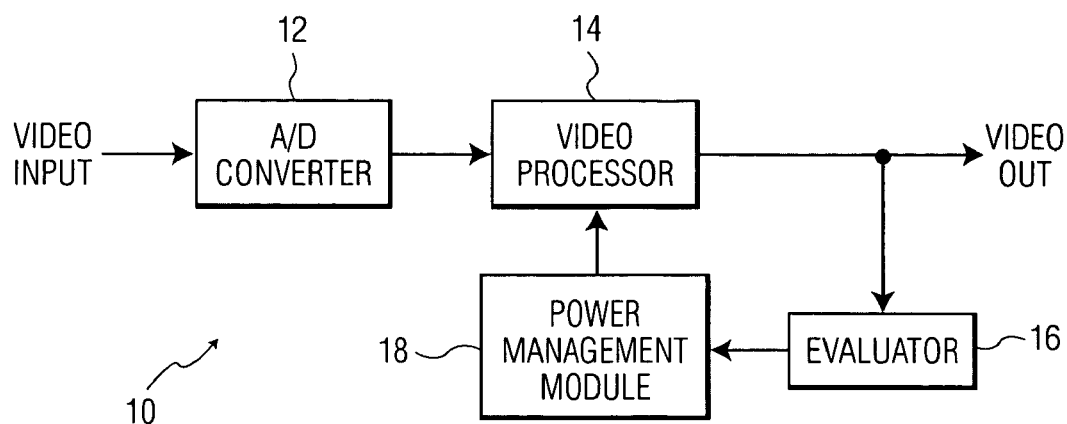
FIG. 1 is a simplified block diagram of a video-processing system according to an embodiment of the present invention.

FIG. 1 shows the major components of the video-processing system 10 according to an exemplary embodiment of the present invention. The video processing system 10 includes an analog-to-digital (A/D) converter 12, a video processor 14, an evaluator 16, and a power-management module 18. It should be noted that although the present invention is described hereinafter with particular reference to the system block diagram of FIG. 1, it is to be understood at the outset of the description which follows, that the apparatus and methods in accordance with the present invention may be used with other hardware configurations of the planner board.

In operation, incoming video signals are digitized in a known manner by the A/D converter 12 to produce a stream of digital video signals. In a video application, the standard video output signal from a video-capturing device typically has about 8-bits of luminance-channel dynamic range (i.e., 256 gray scale or intensity levels). Then, the digital-video stream, including a sequence of picture elements (pixels), is forwarded to the video processor 14. The video processor 14 processes each pixel in the digital video stream according to the power level that is selected by the power-management module 18. The output of the video processor 14 is coupled to the evaluator 16, which serves to detect the video-quality metric. The output of the evaluator 16 is feedback to the power-management module 18 and, based on the detected video-quality metric, one of the pre-selected power consumption by the video processor 14 is selected. To this end, a predetermined look-up table indicative of different combinations of video-processing modules to generate different power consumptions is stored in the power-management module 18. That is, a number of video-processing modules, including the color-enhancement module A, sharpness-improvement module B, mpeg-2 de-blocker module C, and white-noise-removal module D, is provided in the video processor 14 to produce a wide range of image quality on the display device.

Figure 2:
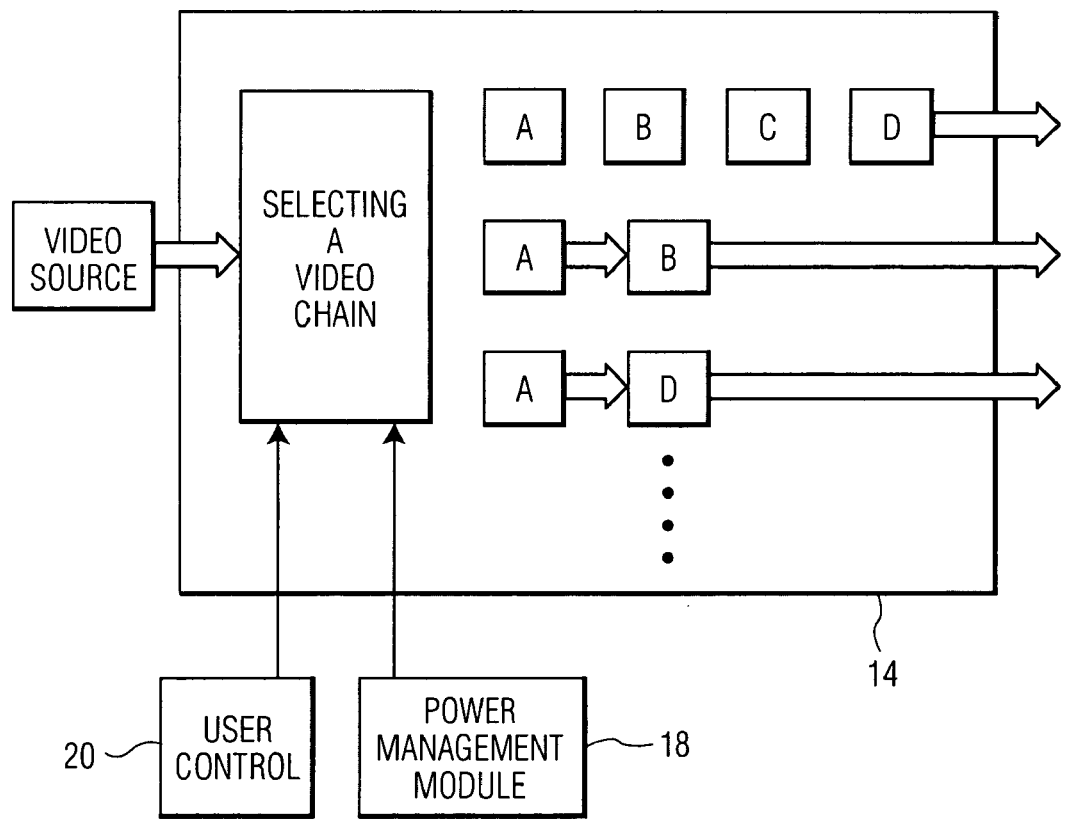
FIG. 2 illustrates a schematic diagram of the video processor shown in FIG. 1.

FIG. 2 illustrates a schematic diagram of the video processor shown in FIG. 1. The video processor 14 includes four modules, which are considered to be essential for high-end display sets. They include: (1) the sharpness module for boosting higher frequencies in the luminance signal; (2) the de-blocker B implemented using polyphase FIR filters. (In the case of expansion, up-sampling is performed either by a polyphase filter for which the expansion factor determines the filter phases required to generate each output pixel, or by a filter that uses this factor to interpolate the output pixels from the input pixels. In the case of compression, a transposed polyphase filter is used to down-sample the input data, and the compression factor determines the required filter phases); (3) the de-noiser C for reducing the higher-frequency components based on measuring the presence of noise; and, (4) the color-modification module D for stretching the luminance values for the black color and the white color to better represent the color content of the video sequence.

FIG. 3 illustrates a set of processing modules producing different levels of picture quality. Each one of the video processing chains will achieve a certain level of picture quality and the levels of power consumption have been pre-defined. As shown in FIG. 3, if all video-processing modules A, B, C, and D were activated during the video-processing mode, the highest picture quality at maximum power consumption is obtained. For moderate quality and power consumption, some of the modules C and D can be turned off. As there are a set of four video-processing modules A–D, 24 different ways to activate the modules in different combinations is available (4!=24). Although a limited number of modules is shown in FIG. 3 for illustrative purposes, it is to be understood that the video processor 14 can support a much larger number of video-processing modules. Thus, the number of modules in the drawing should not impose limitations on the scope of the invention.

Referring back to FIG. 2, a key principle of the present invention is to provide a trade-off between the perceived picture quality and the level of power consumption. In the embodiment, different settings of these modules (or a subset of them) in response to the objective-image quality metrics from the evaluator 16 for predicting the video quality is used to vary the power-consumption level. In addition, the remaining battery life is considered when picking the most suitable video-processing chain. In an alternate embodiment, the operator may selectively change the setting of the processing modules to adjust the amount of power permitted for video display. For example, the operator may select poorer picture quality to enhance the battery life.

FIG. 4 illustrates an exemplary look-up table that may be stored in the power-management module 18 to adjust the settings of the modules A–D. The look-up table includes one tabular entry associated with each of the functional modules of the video processor 14. According to the embodiment of the present invention, the video processing unit 14 changes the level of power consumption by changing two factors: the modules that comprise the video chain and the values of each module's parameter, according to a desired picture quality. Again, while FIG. 4 shows a limited number of power levels indexed with the corresponding module settings, it will be appreciated by those skilled in the art that a much larger number of power settings may be practiced in accordance with the techniques of the present invention. The setting of the video-power level is determined based on the objective-image-quality metrics obtained by the evaluator. Predicting the video quality is well known in the art that can be performed in a variety of ways. See for example, a Provisional Application No. 60/290,506 filed by the Applicant on May 11, 2001, assigned to the same assignee, the content of which is hereby incorporated by reference.

Briefly, the provisional application discloses a method for providing a composite objective-image-quality metric, which blends the evaluation of a white-noise measurement unit, a blocking detector, a contrast-measuring unit and clipping. Then, the readings of these modules are weighted by weight factors and are linearly combined. The weights are calculated to maximize the correlation between the overall objective-image-quality measure and the subjective evaluation on a pre-defined set of video sequences. The output is clipped using a clipping function, which ensures that only the noise that contributes perceptually is counted. The clipping-function thresholds are derived from Watson's model of perception threshold. The blocking-impairment metric (BIM) is primarily based on the measurement of the intensity difference across block edges of the decoded image. The measurement is done separately for horizontal and vertical blocking. The contrast-measuring unit averages out the difference between the maximum and the minimum luminance values per block in the image. Finally, an objective metric is assigned to a value indicative of video-quality evaluation.

As described above, the evaluator 16 analyzes the digital-video-stream output to provide an objective metric value for automatically evaluating video quality, based on the objective metric of a video image, and provides a control signal indicative of the video quality to the power-management module 18. Upon receiving the control signal indicating the quality of the video image, the power-management module 18 retrieves the corresponding new power level and forwards the power level to the video processor 14, such that the video processor 14 now processes the incoming digital video signals at the new power level. The pixel-by-pixel processing of the video processor 14 is performed substantially in real time (i.e., at a video rate). Accordingly, the video processor 14 processes each received pixel in accordance with the tabular entry associated with the functionality of the respective modules.

While the preferred embodiments of the present invention have been illustrated and described, it will be understood by those skilled in the art that various changes and modifications may be made, and equivalents may be substituted for elements thereof without departing from the true scope of the present invention. In addition, many modifications may be made to adapt to a particular situation and the teaching of the present invention without departing from the central scope. Therefore, it is intended that the present invention not be limited to the particular embodiment disclosed as the best mode contemplated for carrying out the present invention, but that the present invention include all embodiments falling within the scope of the appended claims.

What is claimed is:

1. A method for scaling the power consumption of a video processor having a plurality of video-processing modules, the method comprising the steps of:
   receiving a sequence of video signals for a video-quality evaluation;
   determining an objective-image-quality metric of the sequence of said video signals, said objective-image-quality metric indicative of video quality;
   obtaining a new power-consumption level of said video processor based on said determined objective-image-quality metric from a predetermined table; and,
   processing the sequence of said video signals according to said new power-consumption level,
wherein the plurality of said video-processing modules comprises a color-enhancement module, a sharpness-improvement module, a de-blocker module, and a white-noise-removal module.

2. The method of claim 1, wherein said new power-consumption level is obtained by selectively activating at least one of said video-processing modules.

3. The method of claim 1, wherein said predetermined table includes a number of different combinations of said video-processing modules to generate a plurality of levels of image quality.

4. The method of claim 1, wherein said predetermined table includes a number of different combinations of said video-processing modules to generate a plurality of power-consumption levels by said video processor.

5. The method of claim 1, further comprising the steps of setting said new power-consumption level manually by a user; and, processing the sequence of said video signals according to said new power-consumption level set by said user.

6. A method for scaling the power consumption of a video processor having a plurality of video-processing modules, the method comprising the steps of:
   converting a stream of video signals to a plurality of pixels;
   processing each of said pixels of said video stream at a preset power-consumption level to produce a processed image stream;
   determining an objective-quality metric of said pixel characteristic indicative of video quality in said image stream; and,
   obtaining a new power-consumption level for processing each of said pixels of said video stream according to predetermined criteria,
wherein the plurality of said video-processing modules comprises a color-enhancement module, a sharpness-improvement module, a de-blocker module, and a white-noise-removal module.

7. The method of claim 6, wherein said new power-consumption level is obtained by selectively activating at least one of said video-processing modules.

8. The method of claim 6, wherein the step of obtaining said new power-consumption level comprises the step of modifying a combination of said video-processing modules that is used to process each of said pixels of said video stream.

9. The method of claim 6, wherein said predetermined criteria comprise a number of different combinations of said video-processing modules to generate a plurality of levels of image quality.

10. The method of claim 6, wherein said predetermined criteria comprise a number of different combinations of said video-processing modules to generate a plurality of power-consumption levels by said video processor.

11. The method of claim 6, further comprising the steps of setting said new power-consumption level manually by a user; and, processing each of said pixels of said video stream according to said new power consumption set by said user.

12. An apparatus for scaling the power consumption of a video processor, comprising:
   a video processor having a plurality of video-processing modules for receiving a stream of image signals at an input and producing a processed image stream at an output, said video processor processing each received pixel of said image stream according to a preset power-consumption level;
   an evaluator, coupled to said video processor, for determining an objective-quality metric of said pixel characteristics indicative of video quality in said image stream; and,
   a power-management module, coupled to said evaluator, for obtaining a new power-consumption level for said video processor from a predetermined table based on said determined objective-quality metric of said evaluator,
wherein the plurality of said video-processing modules includes a color-enhancement module, a sharpness-improvement module, a de-blocker module, and a white-noise-removal module.

13. The apparatus of claim 12, further comprising a converter for converting analog signals into corresponding digital signals, wherein the digital signals include a plurality of pixels.

14. The apparatus of claim 12, wherein said predetermined table includes a number of different combinations of said video-processing modules to generate a plurality of power-consumption levels.

15. The apparatus of claim 12, further comprising a user control, coupled to said video processor, for setting said new power-consumption level manually by a user.

* * * * *